(12) United States Patent
Park

(10) Patent No.: US 9,405,490 B2
(45) Date of Patent: Aug. 2, 2016

(54) ELECTRONIC APPARATUS, MANAGEMENT SERVER, PRINT SYSTEM AND METHOD OF CONTROLLING PRINTING INCLUDING DETERMINING A PLURALITY OF STORAGES TO STORE PRINT DATA

(71) Applicant: Samsung Electronics Co., Ltd., Suwon-si (KR)

(72) Inventor: Seong-taek Park, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/584,318

(22) Filed: Dec. 29, 2014

(65) Prior Publication Data

US 2015/0193673 A1   Jul. 9, 2015

(30) Foreign Application Priority Data

Jan. 3, 2014 (KR) .................. 10-2014-0000690

(51) Int. Cl.
   *G06F 3/12*    (2006.01)
   *H04N 1/00*   (2006.01)
   *G06K 15/02*  (2006.01)
   *G06K 15/00*  (2006.01)

(52) U.S. Cl.
   CPC ............ *G06F 3/1213* (2013.01); *G06F 3/1267* (2013.01); *G06F 3/1288* (2013.01); *H04N 1/00228* (2013.01); *G06K 15/007* (2013.01); *G06K 15/1806* (2013.01)

(58) Field of Classification Search
   None
   See application file for complete search history.

(56) References Cited

U.S. PATENT DOCUMENTS

| | | | |
|---|---|---|---|
| 5,995,721 A * | 11/1999 | Rourke | G06F 3/1203 358/1.13 |
| 8,390,843 B2 | 3/2013 | Purpura et al. | |
| 2001/0038462 A1* | 11/2001 | Teeuwen et al. | 358/1.15 |
| 2008/0151293 A1* | 6/2008 | Narukawa | G06F 17/30 358/1.15 |
| 2009/0190166 A1* | 7/2009 | Nakamura et al. | 358/1.15 |
| 2010/0253974 A1* | 10/2010 | Hamada | 358/1.15 |
| 2011/0157626 A1 | 6/2011 | Park | |
| 2012/0182573 A1 | 7/2012 | Mok | |
| 2012/0272025 A1* | 10/2012 | Park | G06F 3/0608 711/162 |
| 2012/0307309 A1* | 12/2012 | Ikegaya et al. | 358/1.16 |
| 2013/0003125 A1 | 1/2013 | Morii | |
| 2013/0003127 A1 | 1/2013 | Berglin | |
| 2013/0094051 A1* | 4/2013 | Yamada et al. | 358/1.15 |

FOREIGN PATENT DOCUMENTS

| | | |
|---|---|---|
| JP | 2008-186271 | 8/2008 |
| JP | 2009-238072 | 10/2009 |
| JP | 2012-146197 | 8/2012 |
| KR | 10-2011-0075197 | 7/2011 |

* cited by examiner

*Primary Examiner* — Miya J Cato
(74) *Attorney, Agent, or Firm* — Staas & Halsey LLP

(57) ABSTRACT

An electronic apparatus includes a user interface to receive a print instruction corresponding to a document, a printer driver to generate print data corresponding to the document, a communication interface to request the management server to receive information about a plurality of storages corresponding to the generated print data, and a controller to control the communication interface so that the generated print data is transmitted to an image forming apparatus corresponding to the received storage information.

22 Claims, 14 Drawing Sheets

ELECTRONIC APPARATUS, MANAGEMENT SERVER, PRINT SYSTEM AND METHOD OF CONTROLLING PRINTING INCLUDING DETERMINING A PLURALITY OF STORAGES TO STORE PRINT DATA

CROSS-REFERENCE TO RELATED APPLICATIONS

This application claims priority under 35 U.S.C. §119 from Korean Patent Application No. 10-2014-0000690, filed on Jan. 3, 2014 in the Korean Intellectual Property Office, the disclosure of which is incorporated herein by reference in its entirety.

BACKGROUND OF THE INVENTION

1. Field of the Invention

The present general inventive concept relates to an electronic apparatus, a management server, a print system and a print control method, and more particularly, to an electronic apparatus to store print data to perform pull printing among a plurality of devices including an image forming apparatus and electronic apparatuses connected in a network, to perform printing, and a management server and a print control method.

2. Description of the Related Art

Image forming apparatus generally refers such an apparatus that prints on a recording medium the print data created from a terminal apparatus such as a computer. For example, the image forming apparatus may be a copier, a printer, a facsimile or a multi function peripheral (MFP) which provides integrated services of those mentioned above.

A genera network printing method involves transmission of the print data created at an electronic apparatus of a user to a printing device connected in a network, so that the image forming apparatus performs printing in the order of arrival. However, following shortcomings are anticipated when a plurality of users share the image forming apparatus in the environment mentioned above.

First, when there are already several requests for print jobs by the other users, a user has to wait until the printing for the other users is finished. Further, the user may have difficulty of identifying his own printouts when the other users do not immediately get their printouts after printing. On the other hand, safety issue may also arise, as the printout of one user is exposed to the other users.

Accordingly, recent image forming apparatuses support pull printing, according to which print data transmitted by a user is preliminarily stored at a storage instead of being directly printed out. Then when a user authentication is processed at a specific image forming apparatus, a print job is performed based on the print data stored at the storage of the corresponding image forming apparatus.

Meanwhile, a storage server has been used as a storage for the pull printing, using an electronic apparatus or an image forming apparatus of a user, i.e., using one specific device. However, when one storage is used, service response can be delayed due to congestion of transmissions and receptions at the specific device. The printing job may not be performed smoothly, when the specific device has a fault. The availability of the print data is not ensured, considering the fact that the electronic apparatuses are not always in on state.

SUMMARY OF THE INVENTION

The present general inventive concept provides an electronic apparatus to store print data to perform pull printing among a plurality of devices including an image forming apparatus and electronic apparatuses connected to each other in a network, a management server and a print control method.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing, an electronic apparatus connected to a management server and a plurality of image forming apparatuses including a user interface to receive a print instruction corresponding to a document, a printer driver to generate print data for the document, a communication interface to request the management server to receive information about a plurality of storages corresponding to the generated print data, and a controller to control the communication interface so that the generated print data is transmitted to an image forming apparatus corresponding to the received storage information.

The information about the plurality of storages may include information about two apparatuses among the electronic apparatus and the plurality of image forming apparatuses which are required to store the generated print data until printing thereof.

The user interface may receive an input selecting an image forming apparatus to print the print data, and the information of the plurality of storage may include information about the selected image forming apparatus.

The electronic apparatus may additionally include a storage configured to store the generated print data, when the information of the plurality of storages include the electronic apparatus that generates the print data.

In response to an instruction to delete the stored print data received from the management server, the controller may delete the stored print data of the storage.

In response to an instruction to transmit the stored print data received from the management server, the controller may control the communication interface to transmit the stored print data to an image forming apparatus that corresponds to the instruction to transmit.

The foregoing and/or other features and utilities of the present general inventive concept may also be achieved by providing a management server connected to an electronic apparatus and a plurality of image forming apparatuses including a communication interface to receive a request from the electronic apparatus to receive information about a storage corresponding to generated print data, a job manager to determine a plurality of storages to store the generated print data, among the electronic apparatus and the plurality of image forming apparatuses, and a controller to control the communication interface to transmit the plurality of determined storages to the electronic apparatus that requests the information about the storages.

The job manager may determine two apparatuses to store the generated print data, among the electronic apparatus and the plurality of image forming apparatuses.

The job manager may determine the electronic apparatus generating the print data to be one storage, and determine the other storage from among the plurality of image forming apparatuses.

The job manager may determine the other storage, by considering whether or not the user selected an image forming apparatus when generating the print data, print log of the user, distance to a corresponding electronic apparatus, or print attributes of the print data.

When one of the plurality of determined storages has an error, the job manager may transmit the print data from a storage which is free of error to a new storage, so that the new storage stores the print data.

In response to an instruction to print the print data to one of the plurality of image forming apparatuses, the job manager may cause one of the plurality of storages to transmit the print data to the image forming apparatus which inputs the instruction to print.

When printing of the print data completes, the job manager may cause the print data to be deleted from the plurality of storages.

The foregoing and/or other features and utilities of the present general inventive concept may also be achieved by providing a print system including an electronic apparatus to generate print data corresponding to a document, a plurality of image forming apparatuses to perform a printing job using the generated print data, and a management server to control the electronic apparatus and the plurality of image forming apparatuses so that the generated print data is stored to a plurality of apparatuses among the electronic apparatus and the plurality of image forming apparatuses, until receipt of a user's instruction to print.

The foregoing and/or other features and utilities of the present general inventive concept may also be achieved by providing a print control method of an electronic apparatus connected to a management server and a plurality of image forming apparatuses including receiving a print instruction corresponding to a document, generating print data corresponding to the document, requesting the management server to receive information about a plurality of storages corresponding to the generated print data, and transmitting the generated print data to an image forming apparatus corresponding to the received storage information.

The foregoing and/or other features and utilities of the present general inventive concept may also be achieved by providing a print control method of a management server connected to an electronic apparatus and a plurality of image forming apparatuses including receiving a request from the electronic apparatus to receive information about a storage corresponding to generated print data, determining a plurality of storages to store the generated print data, among the electronic apparatus and the plurality of image forming apparatuses, and transmitting the plurality of determined storages to the electronic apparatus that requests the information about the storages.

The determining may include determining two apparatuses to store the generated print data, among the electronic apparatus and the plurality of image forming apparatuses.

The determining may include determining the storages, by considering whether or not the user selected an image forming apparatus when generating the print data, print log of the user, distance to a corresponding electronic apparatus, or print attributes of the print data.

The print control method may include detecting statuses of the plurality of determined storages, respectively, and when one of the plurality of determined storages has an error, transmitting, by a storage free of error, the print data to a new storage, so that the new storage stores the print data.

In response to an instruction to print the print data to one of the plurality of image forming apparatuses, the method may additionally include transmitting, by one of the plurality of storages, the print data to the image forming apparatus which inputs the instruction to print.

The print control method may additionally include deleting the print data from the plurality of storages in response to completion of the print data.

The foregoing and/or other features and utilities of the present general inventive concept may also be achieved by providing a print control method of a print system including an electronic apparatus, a plurality of image forming apparatuses and a management server, the method including generating, by the electronic apparatus, print data corresponding to a document, determining, by the management server, a plurality of storages to store the generated print data, transmitting, by the electronic apparatus, the generated print data to the plurality of determined storages, and in response to a print instruction, performing, by one of the plurality of image forming apparatuses, a printing job using the print data stored to the plurality of storages.

The foregoing and/or other features and utilities of the present general inventive concept may also be achieved by providing an electronic apparatus connected to a management server and a plurality of image forming apparatuses including a communication interface to request the management server to receive information about a plurality of storages corresponding to generated print data corresponding to a document, and a controller to control the communication interface to transmit the print data to at least one of the plurality of image forming apparatuses based on the received storage information.

The electronic apparatus may further include a user interface to receive a print instruction from a user corresponding to the document, and a printer driver to generate the print data corresponding to the document.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
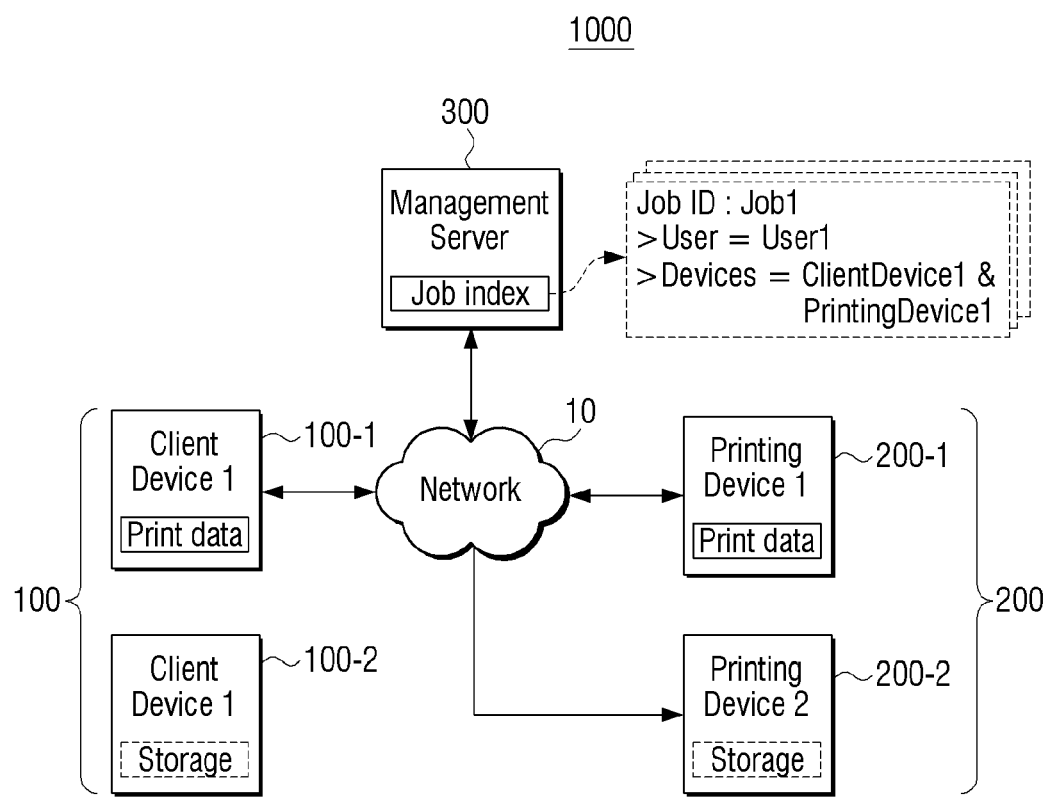
FIG. 1 is a block diagram of a print system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

FIG. 1 is a block diagram of a print system according to an exemplary embodiment of the present general inventive concept.

Referring to FIG. 1, a print system 1000 includes at least one electronic apparatus 100, at least one image forming apparatus 200, and a management server 300.

The electronic apparatus 100 generates print data from a document. The electronic apparatus 100 transmits the generated print data based on the information about a plurality of storages received from the management server 300. The detailed composition and operation of the electronic apparatus 100 will be explained below with reference to FIG. 2. The electronic apparatus 100 may be a desktop computer, a laptop computer, a tablet, a mobile phone, a PMP or a MP3 player, but is not limited thereto. Also, the electronic apparatus 100 may be divided into client device 1 print data 100-1 and client device 1 storage 100-2.

A plurality of image forming apparatuses 200-1 and 200-2 (a.k.a. printing devices 1 and 2, respectively) may each be connected to the electronic apparatus 100 and the management server 300 via network 10. The plurality of image forming apparatuses 200-1 and 200-2 receive print data from the electronic apparatus 100 or another image forming apparatus and print the received print data. The image forming apparatuses 200-1 and 200-2 may be one of the storages that store the print data. The detailed constitution and operation of the image forming apparatus will be explained below with reference to FIG. 3. The image forming apparatus 200 may be not only a printer that is configured to perform print job, but also a multi function peripheral configured to perform print job and other jobs such as scanning, faxing, copying, etc., but is not limited thereto.

The management server 300 is connected to the electronic apparatus 100 and the image forming apparatus 200 via the network 10. The management server 300 determines a plurality of storages to store the print data generated at the electronic apparatus 100. The management server 300 may control the electronic apparatus 100 and the image forming apparatus 200 so that the generated print data is stored to a plurality of storages until the corresponding print data is printed out. When the generated print data is printed out, the management server 300 may cause the storage storing the corresponding print data to delete the corresponding print data. The detailed constitution and operation of the management server 300 will be explained below with reference to FIG. 4.

According to FIG. 1, the print system 1000 stores print data within a plurality of storages. Accordingly, it is still possible to support the pull printing using the print data stored at another device, when one of the storages is out of order. Additionally, because print data is not fixedly transmitted from one specific apparatus, network loads can be relieved. Because separate storage server to store print data is not required, costs to establish a server and operating the same can be reduced.

Figure 2:
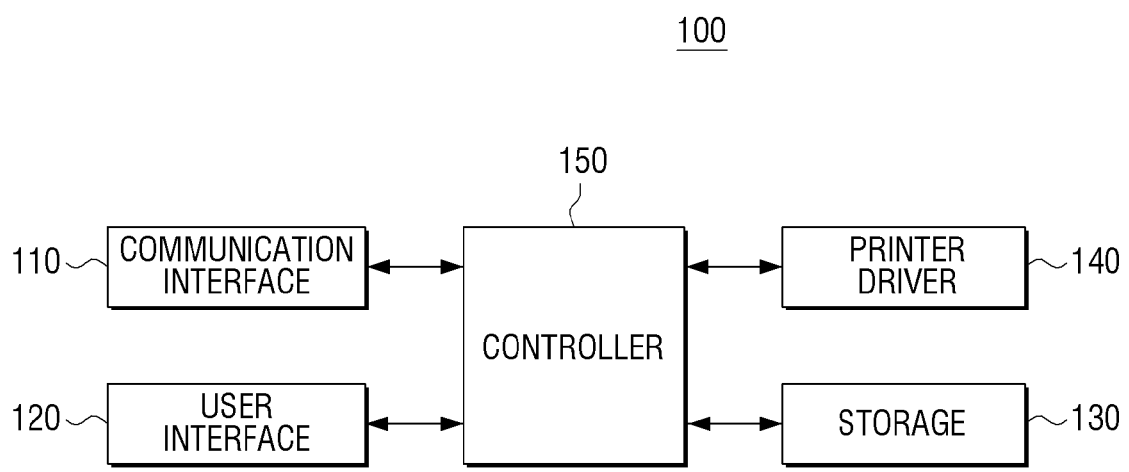
FIG. 2 is a detailed block diagram of the electronic apparatus of FIG. 1.

FIG. 2 is a detailed block diagram of the electronic apparatus 100 of FIG. 1.

Referring to FIG. 2, the electronic apparatus 100 may include a communication interface 110, a user interface 120, a storage 130, a printer driver 140 and a controller 150.

The communication interface 110 is connected to the image forming apparatus 200 and the management server 300 of FIG. 1. That is, the communication interface 110 is configured to connect the electronic apparatus 100 to an external device, and the management server 300 may be accessed by local area network (LAN) and the Internet, or wireless communication (e.g., Global System of Mobile Communications (GSM), Universal Mobile Telecommunications System (UMTS), Long-Term Evolution (LTE), etc.).

The communication interface 110 requests the management server 300 to receive information about a storage where the print data is to be stored, and in response to the request, receives the information. The 'storage' as used herein refers to a device to store corresponding print data until a user inputs a print instruction and/or command from a specific image forming apparatus 200. The plurality of storages are used herein.

The communication interface 110 may transmit and receive print data. That is, the communication interface 110 may transmit the print data generated at the printer driver 140 (to be explained below) according to the storage information as received. The communication interface 110 may receive the print data generated by the other electronic devices from the other electronic devices or image forming apparatuses.

The communication interface 110 may notify status information of the electronic apparatus 100 to the management server 300. The communication interface 110 may receive information about the storage and control instruction from the management server 300. The control instruction may be an instruction to delete the stored print data, or an instruction to transmit the stored print data to a specific device.

The user interface includes a plurality of function keys with which a user can set or select functions supported in the electronic apparatus 100, and may display information that is provided by the print data. The user interface may be implemented as a device such as a touch screen that is capable of both inputting and outputting. The user interface may be implemented as a combined form of mouse and monitor, but is not limited thereto.

The user interface receives an instruction to print a document and receives a setting of the print option to be applied to the document. The user interface may also receive a selection of an image forming apparatus to print the document. In response to an instruction from a user who selects an image forming apparatus to print the document, the user interface may notify the information about the selected image forming apparatus to the management server 300.

The storage 130 stores files. That is, the storage 130 may store files written on document writing application or the like. The files may be document files with extension like DOC, HWP, image files with extension like BMP, or JPG, or print data files with extensions of PDF, or XPS.

The storage 130 may store print data generated at the printer driver 140 (to be explained below). The stored print data may be deleted, as the corresponding print data is printed on a specific image forming apparatus.

Meanwhile, the storage 130 may be implemented as an embedded or external recording medium of the electronic apparatus 100, such as, for example, removable disk including USB memory, or a network web server.

The printer driver 140 generates print data of a document. That is, the printer driver 140 may generate print data of the document based on a print instruction received through the user interface. When generating print data, the printer driver 140 may take print option as set by the user into consideration.

The printer driver 140 requests the management server 300 for the information about a storage where the generated print data is to be stored. The request may include a request to the management server 300 for generating an index corresponding to a specific print job. In response to a notification of a plurality of storages received from the management server, the printer driver 140 may control the communication interface 110 to transmit the generated print data to the devices corresponding to the received storages. When one of the received storages is the printer driver 140 itself, the printer driver 140 may cause the generated print data to be stored within the storage 130.

The controller 150 may control the respective constituents of the electronic apparatus 100. That is, in response to a print request received through the user interface, the controller 150 may control the printer driver 140 to generate print data of the document for which the print request is input.

The controller 150 may then control the communication interface 110 so that the storage information about the generated print data is requested and received, and in response to receiving the storage information, may control the communication interface 110 to transmit the print data to the device that corresponds to the received storage information.

Alternatively, when one of the received storages is the controller 150 itself, the controller 150 may store the generated printer in the storage 130 and delete the stored print data of the storage 130 or transmit the stored print data to another device. For example, when it is unnecessary to store the stored print data of the storage 130 any longer, for reasons such as the print data has already been printed, in response to an instruction to delete received from the management server, the controller 150 may control the storage 130 to delete the corresponding print data. When another storage is in an off state or experiences an error, in response to an instruction to copy onto a specific image forming apparatus received from the management server, the controller 150 may transmit the storage print data of the storage 130 to a device corresponding to the instruction to copy.

As explained above, stable pull printing is implemented, because another electronic apparatus 100 causes the generated print data to store to a plurality of storages.

Figure 3:
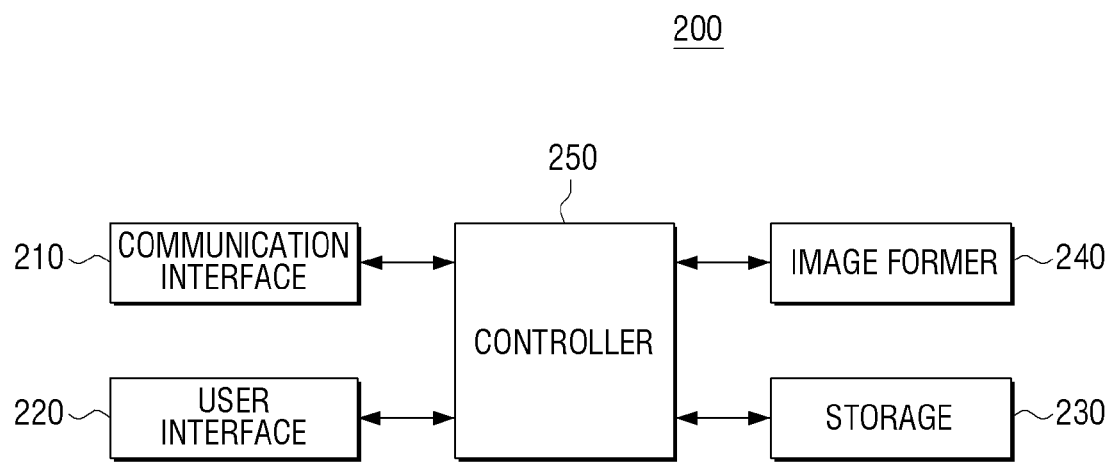
FIG. 3 is a detailed block diagram of the image forming apparatus of FIG. 1.

FIG. 3 is a detailed block diagram of the image forming apparatus 200 of FIG. 1.

Referring to FIG. 3, the image forming apparatus 200 may include a communication interface 210, user interface 220, a storage 230, an image former 240, and a controller 250.

The communication interface 210 is configured to connect the image forming apparatus 200 to an external device (e.g., electronic apparatus 100, management server 300 or other image forming apparatuses), via local area network (LAN) and the Internet, a universal serial bus (USB) port, etc., but is not limited thereto. The communication interface 210 may receive the print data.

The communication interface 210 may receive the print data. That is, the communication interface 210 may receive print data from the electronic apparatus 100 or the other image forming apparatuses.

The communication interface 210 may notify the image forming apparatus 200 with status information. The 'status information' may include information about availability of an image forming apparatus to perform a printing operation, or information about available functions.

The communication interface 210 may receive a control instruction from the management server 300. The control instruction may be an instruction to delete the print data, or an instruction to transmit the stored print data to a specific device.

The communication interface 210 may request the management server 300 to perform a user authentication. The communication interface 210 may request the management server 300 to receive print data to perform a printing operation. That is, when a user requests printing from an image forming apparatus that is not a storage, the communication interface 210 may request the management server 300 to transmit print data. Meanwhile, an exemplary embodiment of the present general inventive concept will be explained below with reference to an example where request to transmit print data is sent to the management server 300 and the requested data is received in return, but not limited thereto. In actual implementation, it is also possible to receive storage information from the management server 300 and directly request a device that corresponds to a storage corresponding to the print data and receive the same in return.

The communication interface 210 may notify the management server 300 of the completion of the printing, when the printing is completed.

The communication interface 210 may include a plurality of function keys with which a user can set or select the functions supported by the image forming apparatus 200, and may display information as provided from the image forming apparatus 200. The user interface 220 may be implemented as a device such as a touch screen that is capable of both inputting and outputting. The user interface may be implemented as a combined form of mouse and monitor, but is not limited thereto.

The user interface 220 receives authentication information. The 'authentication information' as used herein refers to information to identify a user, which may be a user name, ID, employee No., or password, but is not limited thereto.

The user interface 220 receive a request to process printing in accordance with the print job submitted by the user. That is, the user interface 220 may display a list of jobs that an authenticated user can print (i.e., jobs for which print data is generated at electronic apparatus 100 and transmitted to the storages) and receive a user's selection of at least one on the displayed list.

The user interface 220 allows a user to set a print option corresponding to the selected job. That is, the user interface 220 may display preset print options corresponding to the selected job and receive an instruction to select an additional print option, or to delete/modify the previously-selected print option.

The storage 230 may store the print data. The stored print data corresponds to the corresponding image forming apparatus 200 that is determined to be the storage. The stored print data may be printed on the corresponding image forming apparatus 200 or other image forming apparatus.

Meanwhile, the storage 230 may be implemented as an embedded recording medium of the image forming apparatus 200 or an external recording medium, such as, for example, removable disk having USB memory, or a network web server.

The image former 240 prints print data. That is, the image former 240 may perform printing job on a printing paper, by processing operation such as parsing or rendering of the print data.

The controller 250 controls the respective constituents of the image forming apparatus 200. That is, in response to the print data received from another device, the controller 250 stores the received print data to the storage 230. Then in response to a print instruction by an authenticated user through the user interface 220, the controller 250 performs printing job of the print data stored in the storage 230. Meanwhile, when the storage 230 does not have stored print data, the controller 250 may request the management server 300 to receive the print data corresponding to the print job submitted by the user.

As a result, the image forming apparatus 200 according to an exemplary embodiment of the present general inventive concept performs print job of the print data that is not even stored in itself, by requesting the print data to a device that has the print data stored at another storage.

Figure 4:
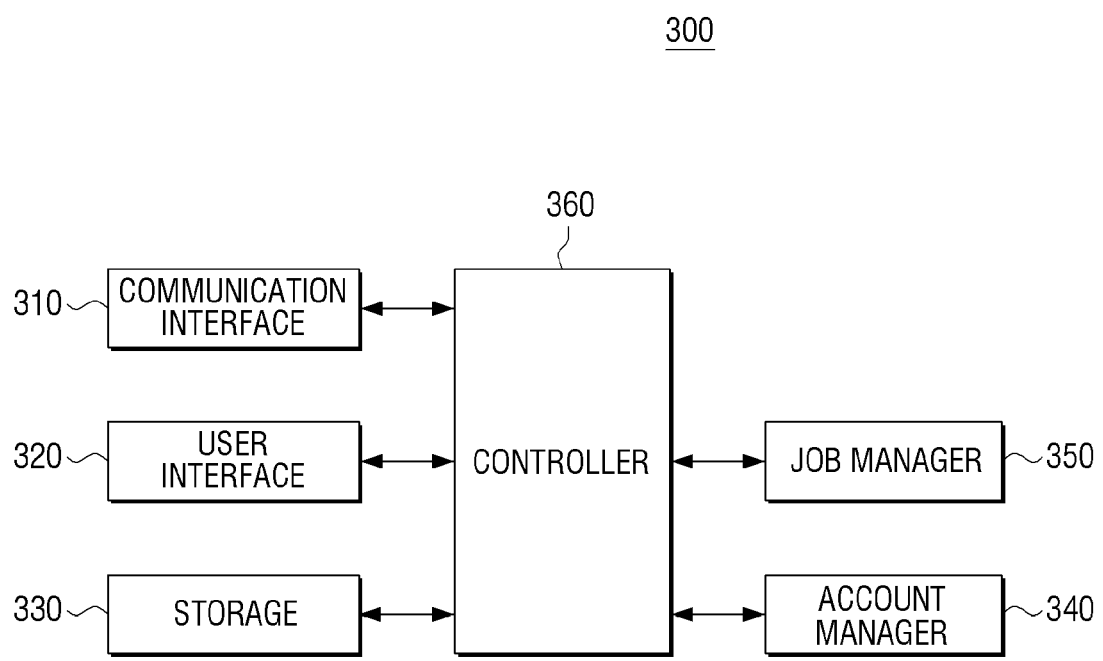
FIG. 4 is a detailed block diagram of the management server of FIG. 1.

FIG. 4 is a detailed block diagram of the management server 300 of FIG. 1.

Referring to FIG. 4, the management server 300 may include a communication interface 310, a user interface 320, a storage 330, an account manager 340, a job manager 350, and a controller 360.

The communication interface 310 is configured to connect the electronic apparatus 100 and a plurality of image forming apparatuses 200, and can be accessed through not only local area network and the Internet, but also wireless communication (e.g., GSM, UMTS, or LTE).

The communication interface 310 receives a request to receive information about storages from the electronic apparatus 100. The communication interface 310 may notify the electronic apparatus 100 that is a requester of the storage information with a plurality of storages determined at the job manager 350 (to be explained below).

The communication interface 310 may receive status information about the electronic apparatus 100 and the plurality of image forming apparatuses 200 in a network. The communication interface 310 may transmit a control instruction to at least one of the electronic apparatus 100 and the plurality of image forming apparatuses 200. The control instruction may be an instruction to delete the stored print data or an instruction to transmit the stored print data to another device.

In response to a request to receive storage information received from the image forming apparatus, the communication interface 310 may transmit the storage information to the corresponding image forming apparatus, or cause the print data corresponding to the storage information to be transmitted to an electronic apparatus that corresponds to the storage information or to the image forming apparatus that requests the image forming apparatus to receive the storage information.

The user interface 320 may include a plurality of functions keys with which a user can set or select functions supported in the management server 300, and may display the information provided by the management server 300. The user interface 320 may be implemented as a device such as a touch screen that is capable of both inputting and outputting. The user interface may be implemented as a combined form of mouse and monitor, and a display such as CRT monitor, an LCD monitor, or an LED, but is not limited thereto.

The storage 330 stores information about user account. The user account information includes information for the purpose of user authentication such as, for example, ID or password.

The storage 330 stores the account information of the image forming apparatus. The account information of the image forming apparatus 200 includes physical address of the image forming apparatus 200, account address, or user account that has authority to use the corresponding image forming apparatus 200.

The storage 330 stores a job index. The job index represents information about a plurality of storages for the print data generated at the electronic apparatus 100, and can include information such as job ID, document name, user ID, print attribute info, device address or device status, but is not limited thereto.

Meanwhile, the storage 330 may be implemented as an embedded recording medium in the management server 300, or external recording medium such as a removable disk having USB memory or a network file server.

The account manager 340 performs management on the user account. That is, in response to a request to receive authentication received from the image forming apparatus 200 based on the prestored information about user account in the storage 330, the account manager 340 may perform authentication based on the information included in the received request to receive the authentication and notify the result to the corresponding image forming apparatus.

The job manager 350 determines a plurality of storages to store the generated print data, among the electronic apparatus and a plurality of image forming apparatuses. To be specific, the job manager 350 may determine two devices to store the generated print data by considering whether the user selects an image forming apparatus 200 when generating the print data, print log of the user, distance to a corresponding electronic apparatus (or whether it belongs to the same subnet), or print attributes of the print data. It is possible to determine the electronic apparatus that generates the print data to be the one storage and determine one of the plurality of image forming apparatuses 200 based on the above conditions. Meanwhile, in actual implementation, two image forming apparatuses 200 may be determined to be the storages.

The job manager 350 may additionally determine a new storage as a replacement, when one of the determined storages develops an error. The detailed manner to make such a determination may be identical to that explained above.

When a new storage is determined, the job manager 350 may cause error-free one of the two existent storages to send the print data to the new storage.

In response to a print instruction to receive the print data received from one of the plurality of image forming apparatuses, the job manager 350 may cause the one of the plurality of storages to transmit the print data to the image forming apparatus where the print instruction is entered. At this time, the job manager 350 may determine a storage among the two storages to send the print data, by considering network performance.

In response to a notification of completed printing of the print data received from the image forming apparatus 200, the job manager 350 causes the corresponding print data to be deleted from the storage that stores the same. Then in response to information notifying deletion of the print data received from the corresponding image forming apparatus 200, the job manager 350 may delete the job index of the corresponding print data. Meanwhile, as explained above, the print data may be deleted provided that the printing of the print data is completed, but not limited thereto. Accordingly, the print data may be deleted when a preset storage time of the print data elapses.

The controller 360 may control the respective constituents of the management server 300. That is, in response to a request to receive storage information received from the electronic apparatus 100, the controller 360 controls the job manager 350 to determine a plurality of storages, and control the communication interface 310 to transmit the information about the plurality of determined storages.

The controller 360 may then detect the operational status of the connected electronic apparatus 100 and the image forming apparatus 00, and when detecting an error from one of the devices operating as the storages, control the job manager 350 to determine a new storage, and control so that the print data is stored to the newly-determined storage.

As explained above, because the management server 300 controls so that the generated print data is stored at a plurality of storages, pull printing is supported even when one of the devices is out of order, by using the print data stored to another device. Further, because the management server 300 does not store print data itself, it does not have to be high performance to support the pull printing, and therefore, network loads can be reduced.

Meanwhile, as explained above with reference to FIG. 4, the management server 300 may operate as an authenticating server, but not limited thereto. Accordingly, in another implementation, another server may take the authentication process.

Figure 5:
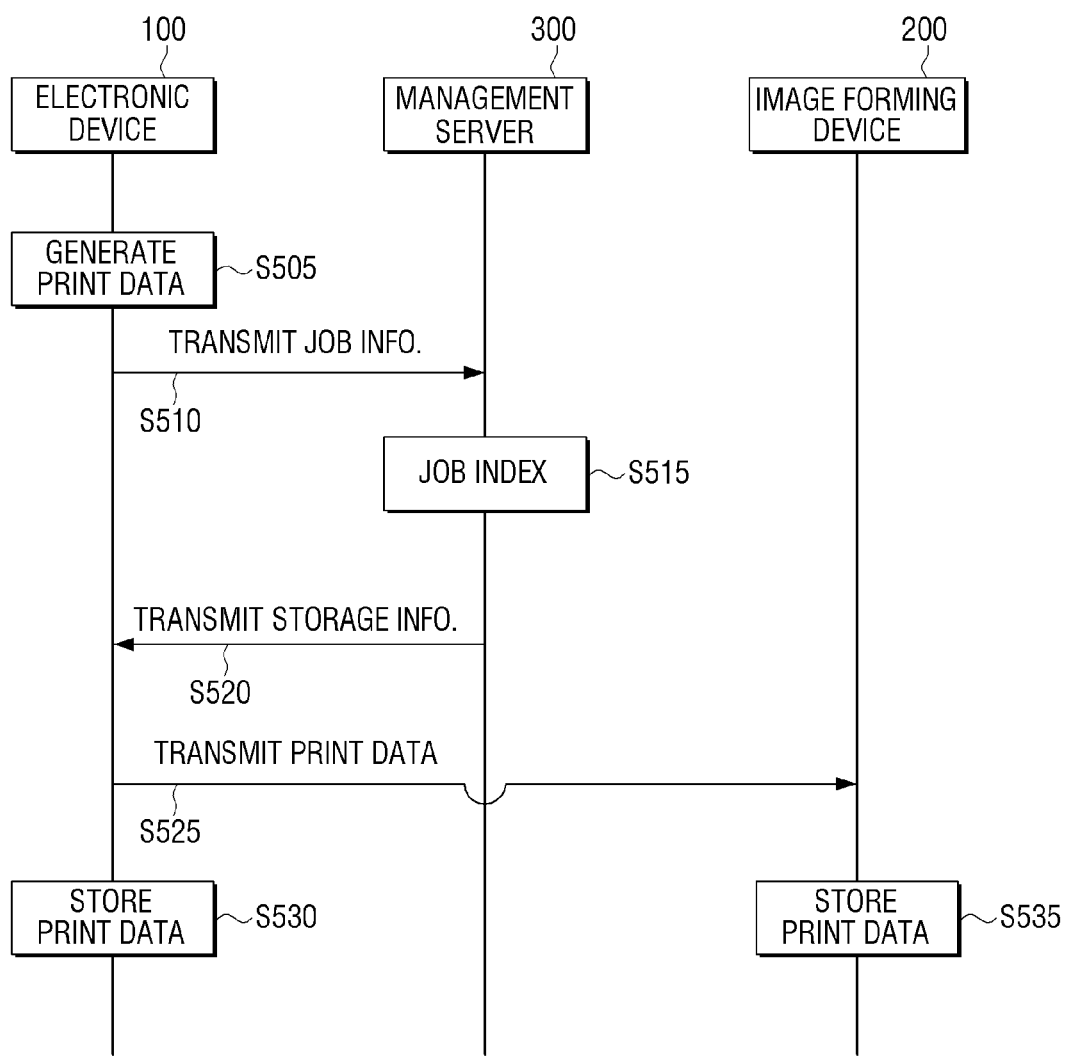
FIG. 5 is a sequence diagram provided to explain an operation of an image forming system according to an exemplary embodiment of the present general inventive concept.

FIG. 5 is a sequence diagram provided to explain an operation of an image forming system according to an exemplary embodiment of the present general inventive concept.

Referring to FIG. 5, first, at S505, the electronic apparatus 100 generates print data of a document in response to a user's instruction. That is, it is possible to generate print data by reflecting print attributes inputted by the user.

At S510, the electronic apparatus 100 requests the management server 300 to receive the storage information about a corresponding job. The request may include an ID of the electronic apparatus 100, print attributes as input, information about whether an image forming apparatus is selected, or address of a corresponding electronic apparatus (or location information).

At S515, the requesting server, i.e., the management server 300 determines a plurality of storages and generates a job index. That is, the management server 300 may determine two devices to store the generated print data, by considering whether or not the user selected an image forming apparatus when generating the print data, print log of the user, distance to a corresponding electronic apparatus, or print attributes of the print data.

At S520, the management server 300 transmits the plurality of determined storages to the electronic apparatus 100. As explained above, the print data is generated and then a storage is requested and received, but not limited thereto. Accordingly, in another implementation, data may be generated after completion of the request for storage and reception thereof, or request and reception and the generation of print data may be performed concurrently. Further, the image forming apparatus may support direct printing, which means printing is processed to correspond to the file itself, in which case generation of the print data may be omitted.

At S535, the electronic apparatus 100 receiving storage information transmits print data to the corresponding storage. The image forming apparatus 200 receiving the transmitted print data stores the received print data, and operates as a storage with respect to the corresponding job.

Meanwhile, when one of the determined storages is the electronic apparatus 100 itself, at S530, the electronic apparatus 100 stores the generated print data. That is, the electronic apparatus 100 operates as the storage.

As explained above, the print system according to an exemplary embodiment of the present general inventive concept stores one piece of print data to a plurality of storages. Accordingly, even when one of the storages is turned off or develops an error, it is possible to continue the printing operation using the print data stored to another storage.

FIGS. 6 through 11 are views provided to explain an operation of an image forming system 1000 according to an exemplary embodiment of the present general inventive concept.

Figure 6:
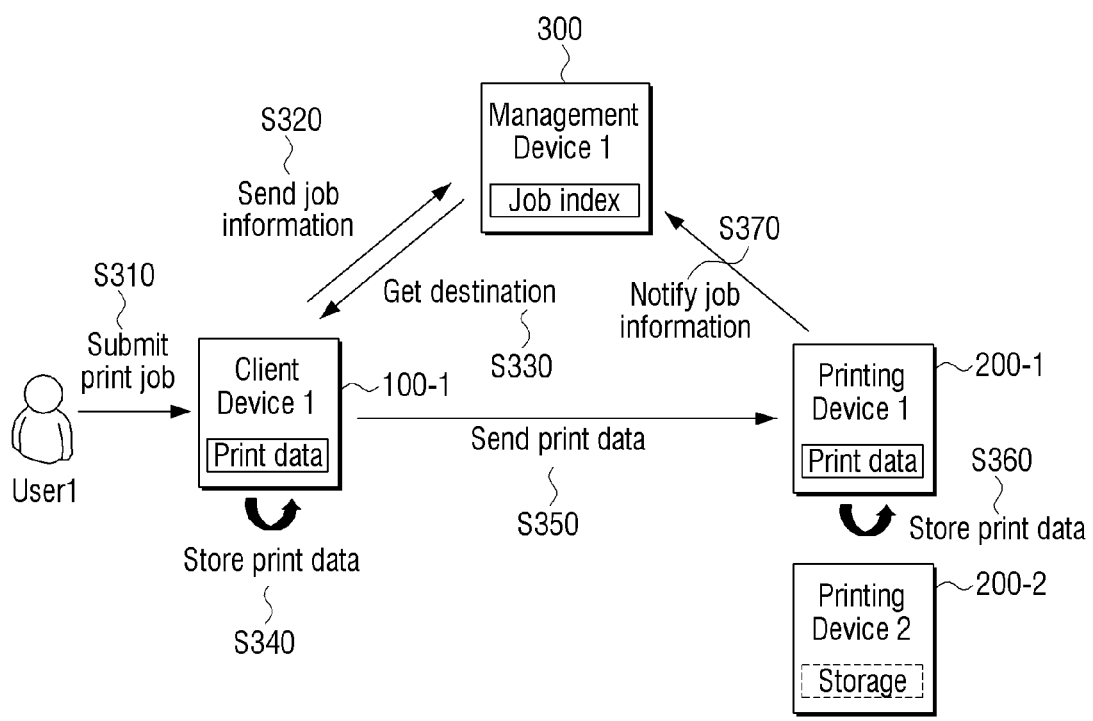
FIG. 6 is a view to explain an operation of an image forming system according to an exemplary embodiment of the present general inventive concept.
Figure 7:
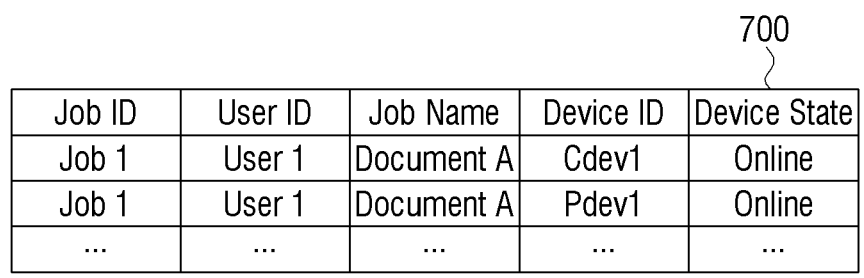
FIG. 7 is a view to explain an operation of an image forming system according to an exemplary embodiment of the present general inventive concept.

To be specific, FIG. 6 is provided to explain an operation of storing print data within a plurality of storages in an initial stage.

At S610, a user instructs a print job through the electronic apparatus 100.

In response to the user's instruction to print, at S620, the electronic apparatus 100 generates print data corresponding to a document, and requests the management server 300 to determine the storages of the document. In response to the request, at S630, the management server 300 determines a plurality of storages to store the document, manages the determined storages under a job list as the one illustrated in FIG. 7, and transmits the determined storages to the electronic apparatus 100.

The electronic apparatus 100 transmits the generated print data based on the received storage information. For example, when one of the received storages is the electronic apparatus 100 itself and another is a first image forming apparatus, at S640, the electronic apparatus 100 may store the generated print data, and at S650, transmit the generated print data to the first image forming apparatus 200-1.

At S660, the first image forming apparatus 200-1 receiving the print data stores the received print data and notifies the management server 300 about the storing of the print data.

By the process explained above, the electronic apparatus 100 and the first image forming apparatus 200-1 operate as two storages for the print data. An example where one of these storages has an error will be explained below with reference to FIGS. 8 and 9.

Figure 8:
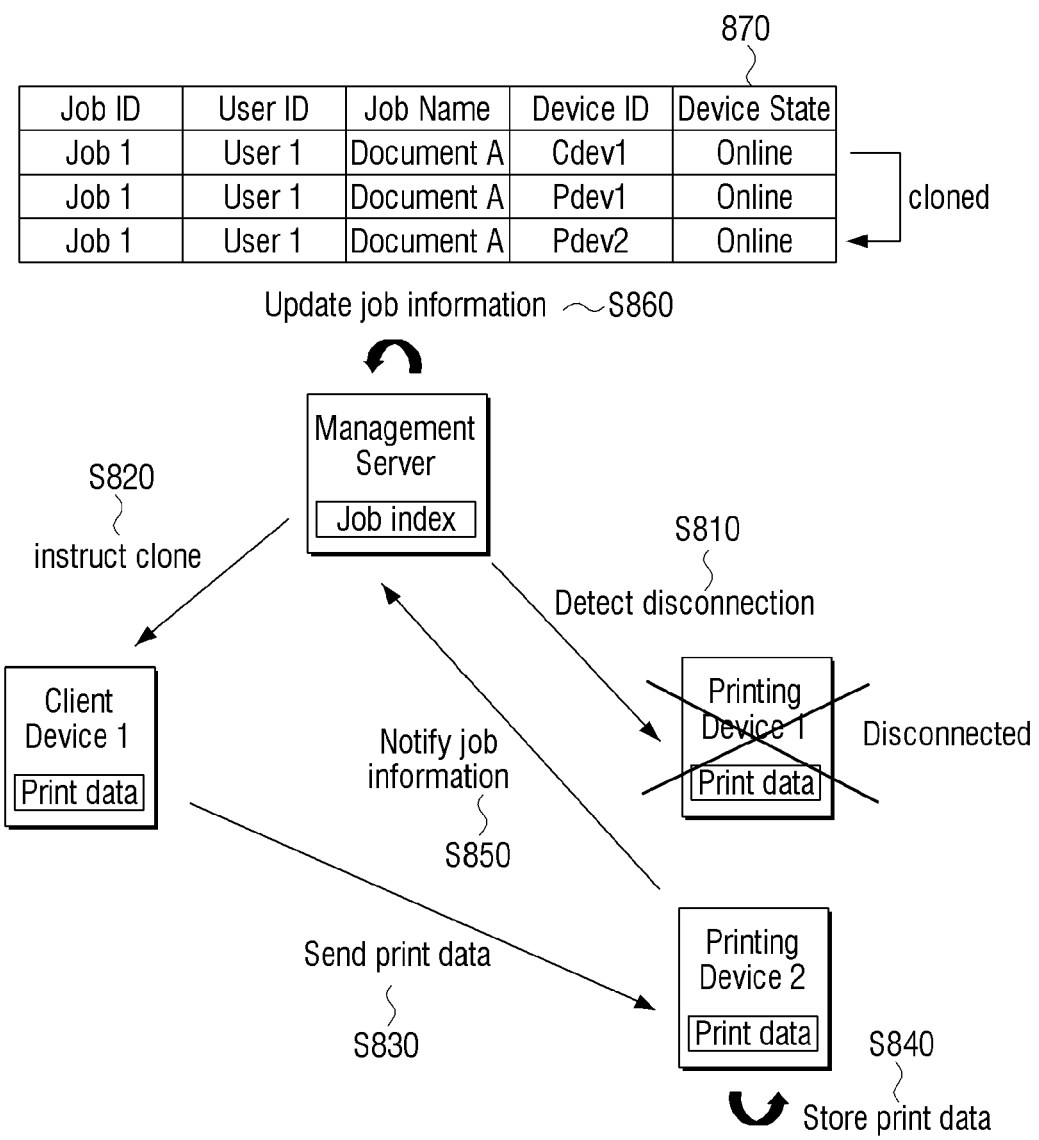
FIG. 8 is a view to explain an operation of an image forming system according to an exemplary embodiment of the present general inventive concept.

FIG. 8 is a view provided to explain an operation of a print system when the first image forming apparatus has an error among a plurality of storages that store the print data as illustrated in FIG. 6.

Referring to FIG. 8, first, the management server 300 detects status of the respective connected devices. At S810, when detecting the connection to the first image forming apparatus is severed, at S820, the management server 300 determines a new storage and transmits a control instruction to transmit the print data stored at the new storage to the electronic apparatus 100 that stores the previous print data.

At S830, the electronic apparatus 100, upon receipt of an instruct clone, transmits the previously-stored print data to a 'second image forming apparatus 200-2 newly determined to be a storage'.

At S840, the second image forming apparatus 200-2, upon receipt of the print data, stores the received print data, and at S850, notifies the management server 300 that the print data is stored. Accordingly, the second image forming apparatus 200-2 operates as a storage.

At S860, the management server 300, upon receipt of the information notifying the storing of the print data, updates the previous job index to a new job index 870.

Accordingly, the plurality of storages, i.e., the electronic apparatus 100 and the first image forming apparatus 200-1 are changed to the electronic apparatus 100 and the second image forming apparatus 200-2 in response to the error of the first image forming apparatus 200-1.

Figure 9:
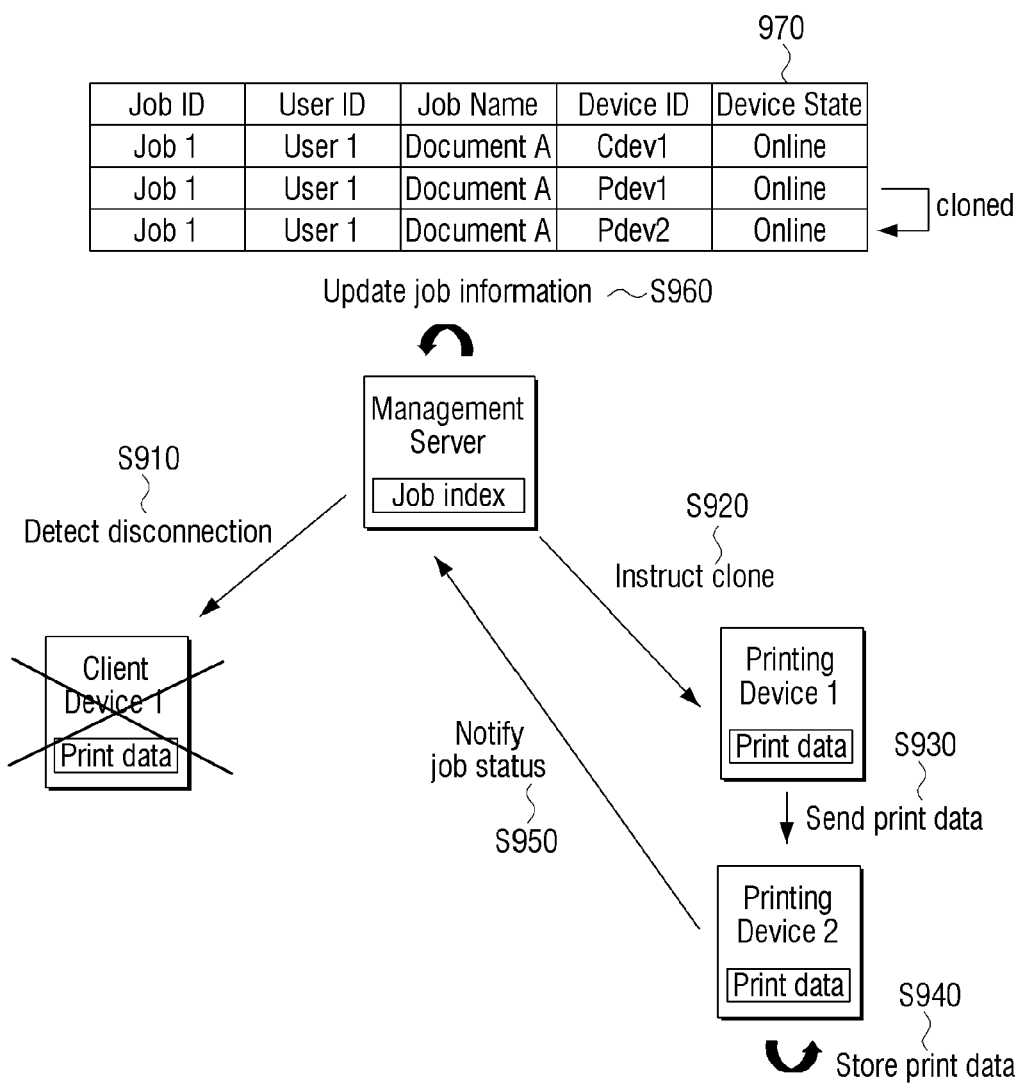
FIG. 9 is a view to explain an operation of an image forming system according to an exemplary embodiment of the present general inventive concept.

FIG. 9 is a view provided to explain an operation of a print system when the electronic apparatus 100 has an error among a plurality of storages storing the print data as illustrated in FIG. 6.

Referring to FIG. 9, the management server 300 detects status of the respective connected devices. At S910, upon detecting the connection to the electronic apparatus 100 be severed, at S920, the management server 300 determines a new storage, and transmits an instruct clone to transmit the print data stored at the new storage 200-2 to the previous first image forming apparatus 200-1 storing the print data.

At S930, the first image forming apparatus 200-1, upon receipt of the instruct clone, transmits the previously-stored print data to the second image forming apparatus 200-2 that is newly determined to be the storage.

At S940, the second image forming apparatus 200-2, upon receipt of the print data, stores the received print data, and at S950, notifies the management server 300 that the print data is stored.

At S960, the management server 300, upon receipt of the information notifying the storing of the print data, updates the previous job index to a new job index 970.

Accordingly, the plurality of storages, i.e., the electronic apparatus 100 and the first image forming apparatus 200-1 are changed to the first and the second image forming apparatuses 200-1, 200-2 in response to the error of the electronic apparatus 100.

Hereinbelow, the operation implemented in response to an input of print command in a state that a plurality of storages store print data as in the case of FIG. 6, will be explained below with reference to FIGS. 10 and 11.

Figure 10:
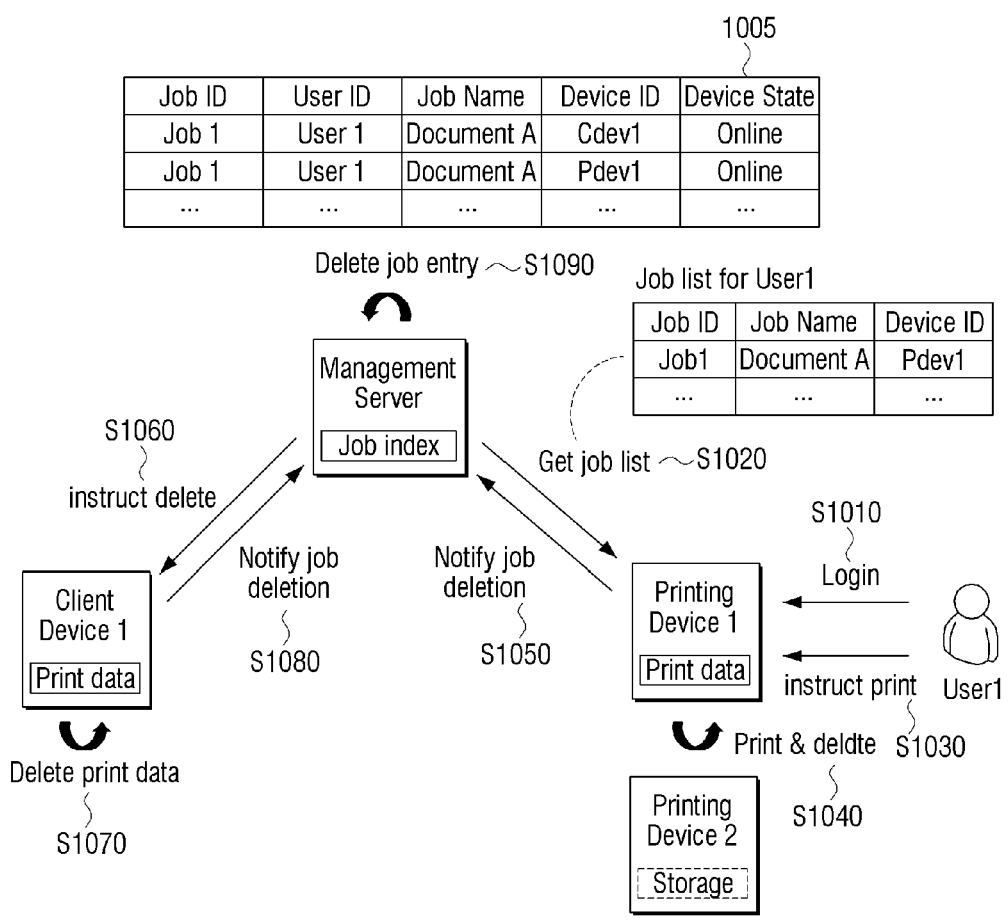
FIG. 10 is a view to explain an operation of an image forming system according to an exemplary embodiment of the present general inventive concept.

FIG. 10 is a view provided to explain an operation of a print system when a print instruction is inputted to the first image forming apparatus 200-1 among a plurality of storages storing the print data as illustrated in FIG. 6.

Referring to FIG. 10, at S1010, the user logs in to the first image forming apparatus 200-1. Upon logging in, i.e., upon successful authentication, at S1020, the first image forming apparatus 200-1 receives a job list of the user from the management server 300 and displays the same.

At S1030, in response to a print instruction inputted by the user on the displayed job list, at S1040, the first image forming apparatus 200-1 performs printing operation using the previously-stored print data. When the printing is completed corresponding to the corresponding print job, at S1040, the first image forming apparatus 200-1 deletes the previously-stored print data, and at S1050, notifies the management server 300 that the printing of the job is completed.

At S1060, the management server 300, upon receipt of the notification of completed print job, transmits a command to another storage to delete the stored print data thereof.

At S1080, the electronic apparatus 100, upon receipt of the delete instruction, deletes the previously-stored print data and notifies the management server 300 that the deletion is completed. At S1090, the management server 300, upon receipt of the notification, deletes the previously-generated job index.

Figure 11:
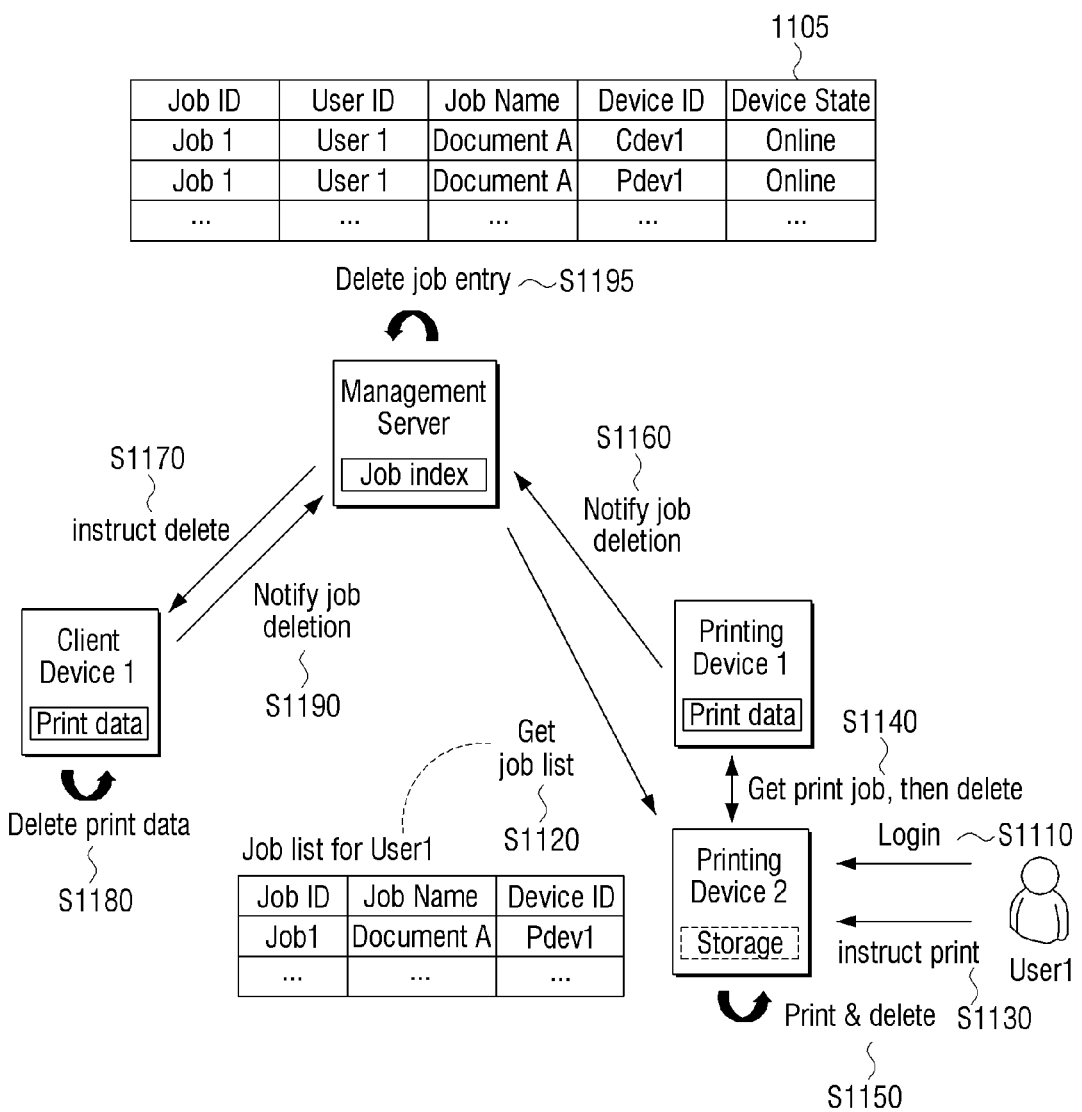
FIG. 11 is a view to explain an operation of an image forming system according to an exemplary embodiment of the present general inventive concept.

FIG. 11 is a view provided to explain an operation of a print system when a print instruction is input to the second image forming apparatus 200-2 among a plurality of storages storing the print data as illustrated in FIG. 6.

Referring to FIG. 11, at S1110, the user logs in to the second image forming apparatus 200-2. Upon logging in, i.e., upon successful authentication, at S1120, the second image forming apparatus 200-2 receives a list of jobs of the user and displays the same.

At S1130, in response to a print job instruction inputted by the user to the displayed job list, at S1140, referring to the received job list, request is sent to the first image forming apparatus 200-1 to receive the print data stored therein, according to which the print data is received. The first image forming apparatus 200-1 deletes the print data, after providing the print data stored therein to the second image forming apparatus 200-2. At S1160, the first image forming apparatus 200-1 notifies the management server 300 that it deletes the print data that has been stored therein.

At S1150, the second image forming apparatus 200-2 upon receipt of the print data from the first image forming apparatus 200-1, performs printing operation using the received print data.

At S1170, the management server 300, upon receipt of the notification that the previously-stored print data has been deleted from the first image forming apparatus 200-1, transmits an instruction to a corresponding storage to store the print data stored therein.

At S1180, the electronic apparatus 100, upon receipt of the delete instruction, deletes the previously-stored print data and notifies the management server 300 that the deletion is completed. At S1190, the management server 300, upon receipt of the notification, deletes previously-generated job index.

Figure 12:
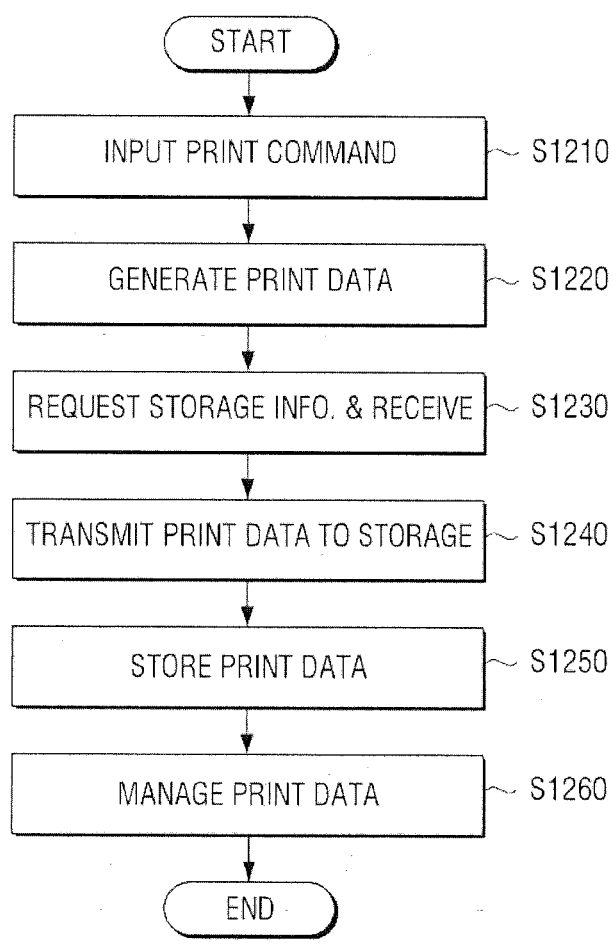
FIG. 12 is a flowchart provided to explain a print control method of an electronic apparatus according to an exemplary embodiment of the present general inventive concept.

FIG. 12 is a flowchart provided to explain a print control method of an electronic apparatus according to an exemplary embodiment of the present general inventive concept.

Referring to FIG. 12, at S1210, a print instruction for a document is input. The print attributes for the document may also be input.

At S120, print data corresponding to the document is generated. Meanwhile, the image forming apparatus may support direct printing, which means printing is processed to correspond to file itself, such that the document itself can be used as the print data without requiring a separate conversion.

At S1230, request to receive the information about plurality of storages corresponding to the generated print data is submitted, and a reply is received. The storage is where the print data is stored before the corresponding document is printed by the image forming apparatus. To ensure availability of the print data, in one exemplary embodiment of the present general inventive concept, a plurality of storages may be used.

At S1240, the print data generated for the image forming apparatus corresponding to the received storage information is transmitted. At S1250, when the received storage information includes the electronic apparatus itself, the generated print data is stored. Otherwise, the storing operation may be omitted.

At S1260, the electronic apparatus operates as a storage of the stored print data. That is, in response to a request to perform a transfer to another device, the print data stored in another device may be transmitted. Meanwhile, in response to a delete instruction corresponding to the print data, the previously-stored print data may be deleted.

Accordingly, because the print control method of an electronic apparatus according to an exemplary embodiment of the present general inventive concept stores generated print data to a plurality of storages, stable pull printing can be provided. The print control method as the one illustrated in FIG. 12 may be implemented on an electronic apparatus constructed as the one illustrated in FIG. 2, or on electronic apparatuses with any other structures.

Figure 13:
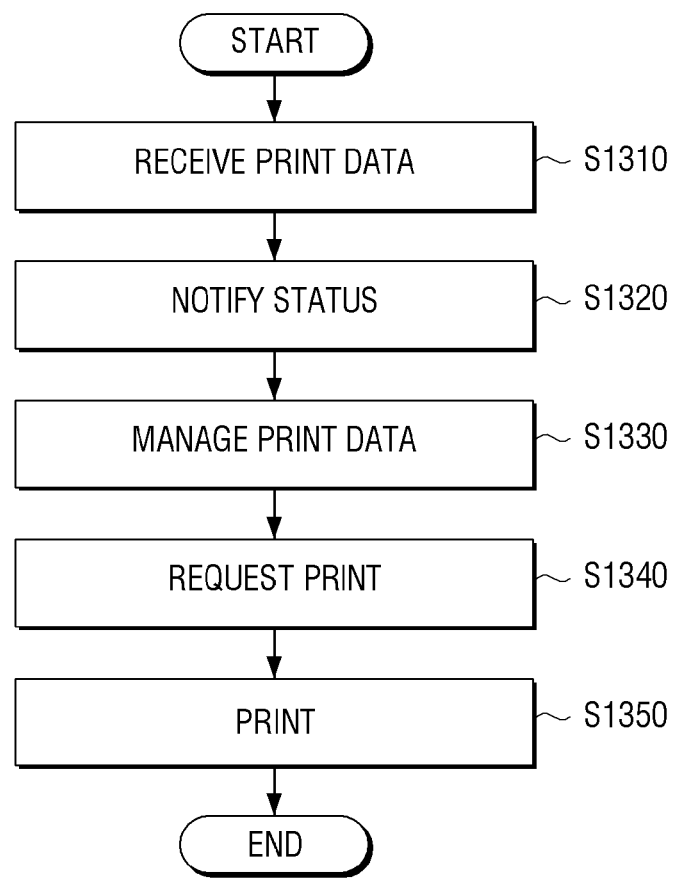
FIG. 13 is a flowchart provided to explain a print control method of an image forming apparatus according to an exemplary embodiment of the present general inventive concept.

FIG. 13 is a flowchart provided to explain a print control method of an image forming apparatus according to an exemplary embodiment of the present general inventive concept.

Referring to FIG. 13, at S1310, print data is received from the electronic apparatus 100. The image forming apparatus 200, upon receipt of the print data, stores the received print data and operates as a storage to store the print data.

That is, at S1320, the image forming apparatus notifies the status of the image forming apparatus 200 to the management server 300, and at S1330, in response to a print data delete/copy instruction, operates accordingly.

Meanwhile, at S1340, when the user requests to process printing through the image forming apparatus, at S1350, the printing operation is performed using the previously-stored print data. Alternatively, the image forming apparatus that does not operate as a storage may request a job list to the management server 300 and process printing operation by receiving the print data from the apparatus that stores the print data.

Upon completion of the printing operation, the previously-stored print data is deleted and completion of the printing and deletion of the print data may be notified to the management server 300.

Accordingly, the print control method according to exemplary embodiments of the present general inventive concept enable an electronic apparatus to process the print job even for the print data that is not directly stored therein, by requesting the print data to another apparatus that stores the print data. The print control method as the one illustrated in FIG. 14 may be implemented on an electronic apparatus constructed as the one illustrated in FIG. 3, or on electronic apparatuses with any other structures.

Figure 14:
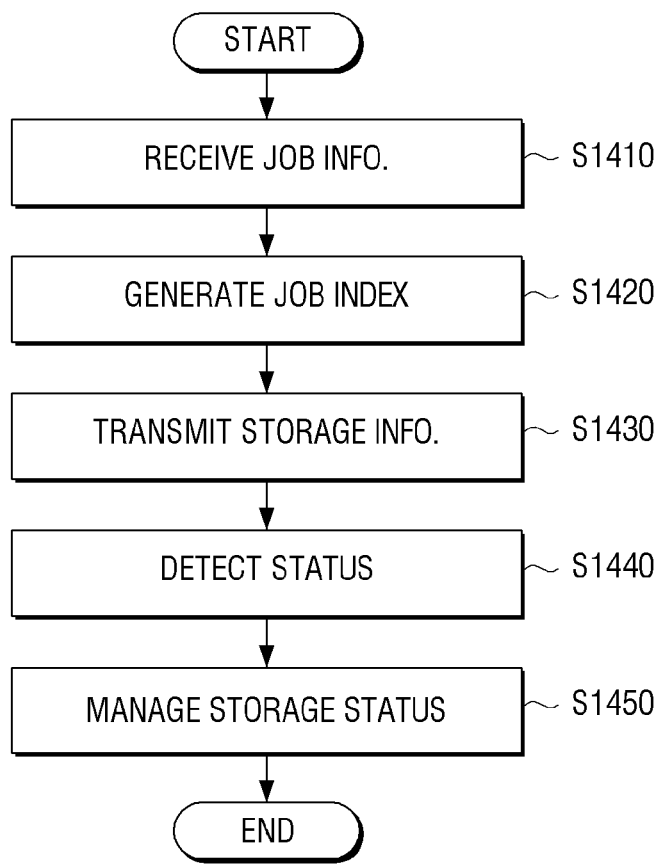
FIG. 14 is a flowchart provided to explain a print control method of a management server according to an exemplary embodiment of the present general inventive concept.

FIG. 14 is a flowchart provided to explain a print control method of a management server according to an exemplary embodiment of the present general inventive concept.

Referring to FIG. 14, at S1410, job information is received from the electronic apparatus 100. The job information may store information such as user information, document attributes, print option or information as to whether image forming apparatus is selected.

At S1420, a plurality of storages to store print data is determined, and job index is generated. That is, two devices to store the generated print data may be determined, by considering whether the user selects an image forming apparatus when generating the print data, print log of the user, distance to a corresponding electronic apparatus (or whether it belongs to the same subnet), or print attributes of the print data.

At S1430, the plurality of determined storages are notified to the electronic apparatus 100.

At S1440, the status of each of the plurality of storages is detected, and at S1450, the storages are managed according to the detected statuses. For example, when one certain storage is not connected to a network or experiences an error, a new storage may be determined, and previously-stored print data may be requested to be transmitted from the storage which is free of error to the new storage.

Accordingly, because the generated print data is stored to a plurality of storages, the print control method according to an exemplary embodiment of the present general inventive concept can support pull printing even when one of the devices experiences an error, by using the print data stored at another device. Further, because the management server 300 does not store the print data by itself, it does not have to be high performance to support the pull printing, and therefore, network loads can be reduced. The print control method as the one illustrated in FIG. 14 may be implemented on an electronic apparatus constructed as the one illustrated in FIG. 4, or on electronic apparatuses with any other structures.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An electronic apparatus connected to a management server and a plurality of image forming apparatuses, comprising:
   a user interface to receive a print instruction corresponding to a document;
   a printer driver to generate print data corresponding to the document;
   a communication interface to request the management server to receive information about a plurality of storages to store the generated print data; and
   a controller to control the communication interface so that the generated print data is transmitted to an image forming apparatus corresponding to the received storage information,
   wherein the plurality of storages is determined by considering any one of print log of the user, distance to a corresponding electronic apparatus, and print attributes of the print data by the management server.

2. The electronic apparatus of claim 1, wherein the information about the plurality of storages comprises information about two apparatuses among the electronic apparatus and the plurality of image forming apparatuses which are required to store the generated print data until printing thereof.

3. The electronic apparatus of claim 1, wherein the user interface receives an input selecting an image forming apparatus to print the print data, and the information of the plurality of storage comprises information about the selected image forming apparatus.

4. The electronic apparatus of claim 1, further comprising a storage configured to store the generated print data, when the information of the plurality of storages include the electronic apparatus that generates the print data.

5. The electronic apparatus of claim 4, in response to an instruction to delete the stored print data received from the management server, the controller deletes the stored print data of the storage.

6. The electronic apparatus of claim 4, wherein, in response to an instruction to transmit the stored print data received from the management server, the controller controls the communication interface to transmit the stored print data to an image forming apparatus that corresponds to the instruction to transmit.

7. A management server connected to an electronic apparatus and a plurality of image forming apparatuses, the management server comprising:
   a communication interface to receive a request from the electronic apparatus to receive information about a storage corresponding to generated print data;
   a job manager to determine a plurality of storages to store the generated print data, among the electronic apparatus and the plurality of image forming apparatuses by considering any one of print log of the user, distance to a corresponding electronic apparatus, and print attributes of the print data; and
   a controller to control the communication interface to transmit the plurality of determined storages to the electronic apparatus that requests the information about the storages.

8. The management server of claim 7, wherein the job manager determines two apparatuses to store the generated print data, among the electronic apparatus and the plurality of image forming apparatuses.

9. The management server of claim 7, wherein the job manager determines the electronic apparatus generating the print data to be one storage, and determines the other storage from among the plurality of image forming apparatuses.

10. The management server of claim 9, wherein the job manager determines the other storage, by considering whether or not the user selected an image forming apparatus when generating the print data, print log of the user, distance to a corresponding electronic apparatus, or print attributes of the print data.

11. The management server of claim 7, wherein, when one of the plurality of determined storages has an error, the job manager transmits the print data from a storage which is free of error to a new storage, so that the new storage stores the print data.

12. The management server of claim 7, wherein, in response to an instruction to print the print data to one of the plurality of image forming apparatuses, the job manager causes one of the plurality of storages to transmit the print data to the image forming apparatus which inputs the instruction to print.

13. The management server of claim 12, wherein, when printing of the print data completes, the job manager causes the print data to be deleted from the plurality of storages.

14. A print system, comprising:
   an electronic apparatus to generate print data corresponding to a document;
   a plurality of image forming apparatuses to perform a printing job using the generated print data; and
   a management server to control the electronic apparatus and the plurality of image forming apparatuses so that the generated print data is stored to a plurality of apparatuses, which is determined by considering any one of print log of the user, distance to a corresponding electronic apparatus, and print attributes of the print data, among the electronic apparatus and the plurality of image forming apparatuses, until receipt of a user's instruction to print.

15. A print control method of an electronic apparatus connected to a management server and a plurality of image forming apparatuses, the print control method comprising:
   receiving a print instruction corresponding to a document;
   generating print data corresponding to the document;
   requesting the management server to receive information about a plurality of storages to store the generated print data; and
   transmitting the generated print data to an image forming apparatus corresponding to the received storage information,
   wherein the plurality of storages is determined by considering any one of print log of the user, distance to a corresponding electronic apparatus, and print attributes of the print data by the management server.

16. A print control method of a management server connected to an electronic apparatus and a plurality of image forming apparatuses, the print control method comprising:
   receiving a request from the electronic apparatus to receive information about a storage corresponding to generated print data;
   determining a plurality of storages to store the generated print data, among the electronic apparatus and the plurality of image forming apparatuses by considering any one of print log of the user, distance to a corresponding electronic apparatus, and print attributes of the print data; and
   transmitting the plurality of determined storages to the electronic apparatus that requests the information about the storages.

17. The print control method of claim 16, wherein the determining comprises determining two apparatuses to store the generated print data, among the electronic apparatus and the plurality of image forming apparatuses.

18. The print control method of claim 16, wherein the determining comprises determining the storages, by considering whether or not the user selected an image forming apparatus when generating the print data, print log of the user, distance to a corresponding electronic apparatus, or print attributes of the print data.

19. The print control method of claim 16, further comprising:
   detecting statuses of the plurality of determined storages, respectively; and
   when one of the plurality of determined storages has an error, transmitting, by a storage free of error, the print data to a new storage, so that the new storage stores the print data.

20. The print control method of claim 16, in response to an instruction to print the print data to one of the plurality of image forming apparatuses, the print control method further comprising transmitting, by one of the plurality of storages, the print data to the image forming apparatus which inputs the instruction to print.

21. The print control method of claim 20, further comprising:
   deleting the print data from the plurality of storages in response to completion of the print data.

22. A print control method of a print system comprising an electronic apparatus, a plurality of image forming apparatuses and a management server, the print control method comprising:
   generating, by the electronic apparatus, print data corresponding to a document;
   determining, by the management server, a plurality of storages to store the generated print data by considering any one of print log of the user, distance to a corresponding electronic apparatus, and print attributes of the print data;
   transmitting, by the electronic apparatus, the generated print data to the plurality of determined storages; and in response to a print instruction, performing, by one of the plurality of image forming apparatuses, a printing job using the print data stored to the plurality of storages.

\* \* \* \* \*